US009141567B2

(12) United States Patent
Pennock et al.

(10) Patent No.: US 9,141,567 B2
(45) Date of Patent: Sep. 22, 2015

(54) SERIAL COMMUNICATION INPUT OUTPUT INTERFACE ENGINE

(75) Inventors: James D. Pennock, Salt Lake City, UT (US); Ronald Baker, Sandy, UT (US); Brian R. Parker, West Valley City, UT (US); Christopher Belcher, Lehi, UT (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 187 days.

(21) Appl. No.: 11/771,743

(22) Filed: Jun. 29, 2007

(65) Prior Publication Data

US 2008/0016260 A1      Jan. 17, 2008

Related U.S. Application Data

(60) Provisional application No. 60/830,283, filed on Jul. 11, 2006.

(51) Int. Cl.
| | | |
|---|---|---|
| *G06F 3/00* | (2006.01) | |
| *G06F 13/16* | (2006.01) | |
| *H04L 12/861* | (2013.01) | |
| *G06F 13/38* | (2006.01) | |
| *G06F 5/10* | (2006.01) | |

(52) U.S. Cl.
CPC .............. *G06F 13/1615* (2013.01); *G06F 5/10* (2013.01); *G06F 13/385* (2013.01); *H04L 49/90* (2013.01)

(58) Field of Classification Search
None
See application file for complete search history.

(56) References Cited

U.S. PATENT DOCUMENTS

| | | | |
|---|---|---|---|
| 4,809,217 A | 2/1989 | Floro et al. | |
| 5,581,779 A * | 12/1996 | Hall et al. ........................ 712/43 |
| 6,112,017 A * | 8/2000 | Wise .............................. 712/200 |
| 6,421,274 B1 | 7/2002 | Yoshimura | |
| 7,209,440 B1 * | 4/2007 | Walsh et al. ................... 370/230 |
| 2003/0167368 A1 | 9/2003 | Tanaka | |
| 2004/0062239 A1 * | 4/2004 | Seo et al. ....................... 370/366 |

FOREIGN PATENT DOCUMENTS

| | | |
|---|---|---|
| DE | 195 29 718 A1 | 2/1997 |
| EP | 1 517 331 A2 | 3/2005 |
| WO | WO 03/003237 A2 | 1/2003 |
| WO | WO 2005/069121 A1 | 7/2005 |

OTHER PUBLICATIONS

John L. Hennessy and David A. Patterson, "Pipelining: Basic and Intermediate Concepts" Appendix A, pp. A2-A87, Computer Architecture A Quantitative Approach, Third Edition, 2003.
John L. Hennessy and David A. Patterson, "Enhancing Performance with Pipelining" Chapter 6, pp. 436-536, Computer Organization & Design, Second Edition, 1997.

* cited by examiner

*Primary Examiner* — Henry Tsai
*Assistant Examiner* — Aurangzeb Hassan
(74) *Attorney, Agent, or Firm* — Brooks Kushman P.C.

(57) ABSTRACT

A configurable device interface enhances the ability of a processor to communicate with other devices. A configurable serial interface promotes efficient data transmission and reception. The configurable serial interface includes a source of transmit data that the configurable serial interface may access even while data reception is simultaneously completing.

20 Claims, 10 Drawing Sheets

SERIAL COMMUNICATION INPUT OUTPUT INTERFACE ENGINE

PRIORITY CLAIM

This application claims the benefit of priority from U.S. Provisional Application No. 60/830,283, filed Jul. 11, 2006, which is incorporated by reference.

BACKGROUND OF THE INVENTION

1. Technical Field

This disclosure relates to an external device interface engine. In particular, this disclosure relates to an external interface engine for digital signal processors or other types of processors.

2. Related Art

Processors, such as digital signal processors ("DSPs"), communicate with external devices, including other processors and/or memories. Some processors use state machines to facilitate the communication with an external device. These processors may require one state machine for each type of external device with which the processor communicates. Additionally, a separate state machine may be required for each operation that each external device performs.

The proliferation of state machines adds significant time and monetary costs to the design and fabrication of processors. Furthermore, because the state machines and processors often operate at different data rates, wait states must be added to a processor to match the data rate of the state machines. The wait states reduce the processor's efficiency by preventing the processor from proceeding with its operations until it receives a data ready response from the state machine.

Additionally, when a processor, such as a DSP, communicates with a serial device it sends and receives data on a bit-by-bit basis. Some systems directly connect an output of the processor to a serial device. These systems reduce the processor's efficiency since the processor may need to match the rate of data transfer to that of the serial device as well as synchronize the timing of the data rate transfer to the serial device. Other systems may implement an interface between the processor and a serial device. In these systems, the processor must synchronize the timing of the data transfer to the serial interface. Failure to synchronize the timing can result in multiple channels creating a temporal mismatch with respect to one another which may lead to the erroneous processing of the data by the processor and/or the serial device.

Therefore, there is a need for an improved external device interface engine, such as an external memory interface engine or a serial communication input output interface engine.

SUMMARY

A serial communication input output interface engine permits a processor to process data up to substantially the end of a processing period and still have the processed data accessible to a serial device at the beginning of the next processing period; maximizing serial data throughput without delays or temporal mismatches in the data samples. Additionally, the serial communication input output interface engine permits the data processor to operate free of potential time delays imposed by a serial device.

The serial communication interface engine includes a memory subsystem, a swap controller, and a serial controller subsystem. The memory subsystem includes a set of memory spaces, each one of which may alternately and independently communicate with a data processor or the serial controller subsystem. The swap controller controls the communication paths between the data processor accessible memory space and the serial controller subsystem accessible memory. The serial controller subsystem accesses its current memory space and communicates with one or more serial device while the data processor is allowed full access to its current memory space and can independently process data at the data processor's desired data rate.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

This disclosure may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
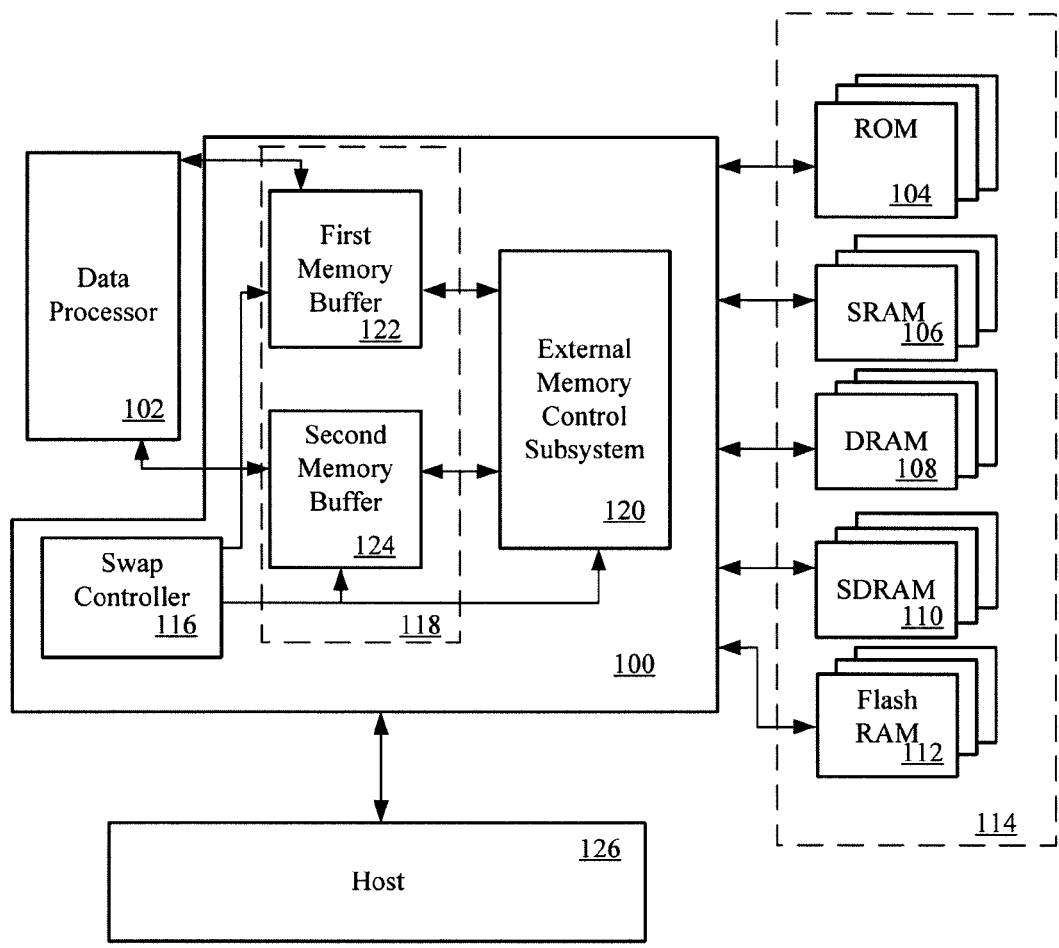
FIG. 1 shows a block diagram of an external memory interface engine.

FIG. 1 shows a block diagram of an external memory interface engine 100. The external memory interface engine 100 may encompass hardware and/or software that are capable of running on one or more processors in conjunction with one or more operating systems. The external memory interface engine 100 facilitates communication between a data processor 102, such as a microcontroller; a microprocessor; an embedded controller; or a digital signal processor, and one or more external memories, such as Read Only Memory ("ROM") 104, Static Random Access Memory ("SRAM") 106, Dynamic Random Access memory ("DRAM") 108, Synchronous DRAM ("SDRAM") 110, Flash RAM 112, and/or any other type of volatile and/or non-volatile memory, storage location, or storage device, hereafter collectively referred to as external memory 114. The external memory interface engine 100 may include a swap controller 116, a memory subsystem 118, and an external memory control subsystem 120.

The memory subsystem 118 may include a set of buffer memory spaces. The set of buffer memory spaces may include a first buffer memory 122 and a second buffer memory 124. The buffer memories 122 and 124 store external memory control information, address information and/or data which are processed by the external memory control subsystem 120 when an access operation (e.g., a read or write) to an external memory 114 is performed. During a processing period, one of the buffer memories is accessible by the data processor 102 while the other buffer memory is accessible by the external memory control subsystem 120.

The swap controller 116 controls the communication paths between the buffer memories 122 and 124, the data processor 102, and the external memory control subsystem 120. More specifically, the swap controller 116 controls which buffer memory is accessible by the data processor 102 and which buffer memory is accessible by the external memory control subsystem 120. At the beginning of a new processing period, the swap controller 116 swaps the communication paths between the data processor 102, the external memory control subsystem 120, and the buffer memories such that a buffer memory that was previously accessible to the data processor 102 is now accessible to the external memory control subsystem 120, and vice-versa. Table 1, below, shows the accessibility of the first and second buffer memories 122 and 124 for four different processing periods.

TABLE 1

| Processing Period | First buffer memory accessible by: | Second buffer memory accessible by: |
|---|---|---|
| 1 | Data processor | External memory control subsystem |
| 2 | External memory control subsystem | Data processor |
| 3 | Data processor | External memory control subsystem |
| 4 | External memory control subsystem | Data processor |

For instance, during a first processing period, the first buffer memory 122 is accessible by the data processor 102 and the second buffer memory 124 is accessible by the external memory control subsystem 120, which may communicate with an external memory 114. During this first processing period, the data processor 102 may execute an access operation with respect to the first buffer memory 122 while the external memory control system 120 may use information stored in the second buffer memory 124 to access an external memory 114. At the beginning of the second processing period, the swap controller 116 switches the accessibility of the first and second buffer memories 122 and 124. Data that was stored in the first buffer memory 122 during the first processing period may be used to access an external memory 114 during the second processing period. Similarly, data that was stored in the second buffer memory 124 during the first processing period may be accessed by the data processor 102 during the second processing period. Accordingly, read and/or write operations may be performed by the data processor 102 and to an external memory 114 without direct communication between the two devices.

During each processing period, such as the time between buffer memory swaps, the external memory control subsystem 120 may analyze one or more data elements in the buffer memory that is currently accessible to the external memory control subsystem 120. Based on the analyzed data elements, the external memory control subsystem 120 may execute an external memory access operation. A host device 126 may provide the external memory control subsystem 120 with one or more customizable parameters which configure the external memory control subsystem 120 to communicate with the buffer memory subsystem 118 and an external memory 114.

Address information stored in the buffer memories 122 and 124 may identify a data storage location of an external memory 114 to which data is written or from which data will be read. Additionally, the buffer memories 122 and 124, may store additional information relating to an external memory 114, such as external memory control information. The external memory control information may indicate which external memory 114 will be accessed when multiple external memories are connected to the external memory interface engine 100, the type of external memory, whether data is to be written to or read from a selected external memory, and/or may provide formatting information. The formatting information may indicate whether the address information should be split into two or more addresses, and/or whether an offset should be added to the address information, or provide other formatting information. In some systems, all or part of a buffer memory 122, 124 may be configured as a circularly addressed memory. In these systems, synchronous data signal processing may be performed in a more efficient manner. Depending on the desired implementation, different types of external memory control information may be used, and may be appended to the beginning and/or end of the address data.

The data stored in the buffer memories 122 and 124 may be digital samples of an audio signal, such as samples received from an analog to digital converter, or any other type of digital data. The data stored in the buffer memories 122 and 124 may be accessed at regular intervals based on a clock signal (e.g., synchronously) and/or at irregular intervals (e.g., asynchronously) depending on the type of external memory to be accessed. Buffer memories 122 and/or 124 may vary in size and width. In some interface engines, one or more buffer memories may be 256 words deep by 32 bits wide. In other interface engines, the size and/or width of one or more buffer memories may depend on the implementation desired.

In an alternative implementation, memory subsystem 118 includes a single dual port buffer memory instead of the first and second buffer memories 122 and 124. The swap controller 116 controls the communication paths between the data processor 102, the external memory control subsystem 120, and the ports of the dual port buffer memory.

In yet another implementation, the memory subsystem 118 includes multiple buffer memories that are grouped together as sets. Each set of buffer memories may include one or more data buffer memories and one or more address buffer memories, and/or one or more control buffer memories. The data buffer memory stores data associated with an address stored in the corresponding address buffer memory or with an address and external memory control information stored in an address buffer memory. During a processing period, one set of buffer memories is accessible by the data processor 102 while the other set of buffer memories is accessible by the external memory control subsystem 120, which may also access an external memory 114. The swap controller 116 controls the communication paths between the data processor 102, the external memory control subsystem 120, and the sets of buffer memories.

Figure 2:
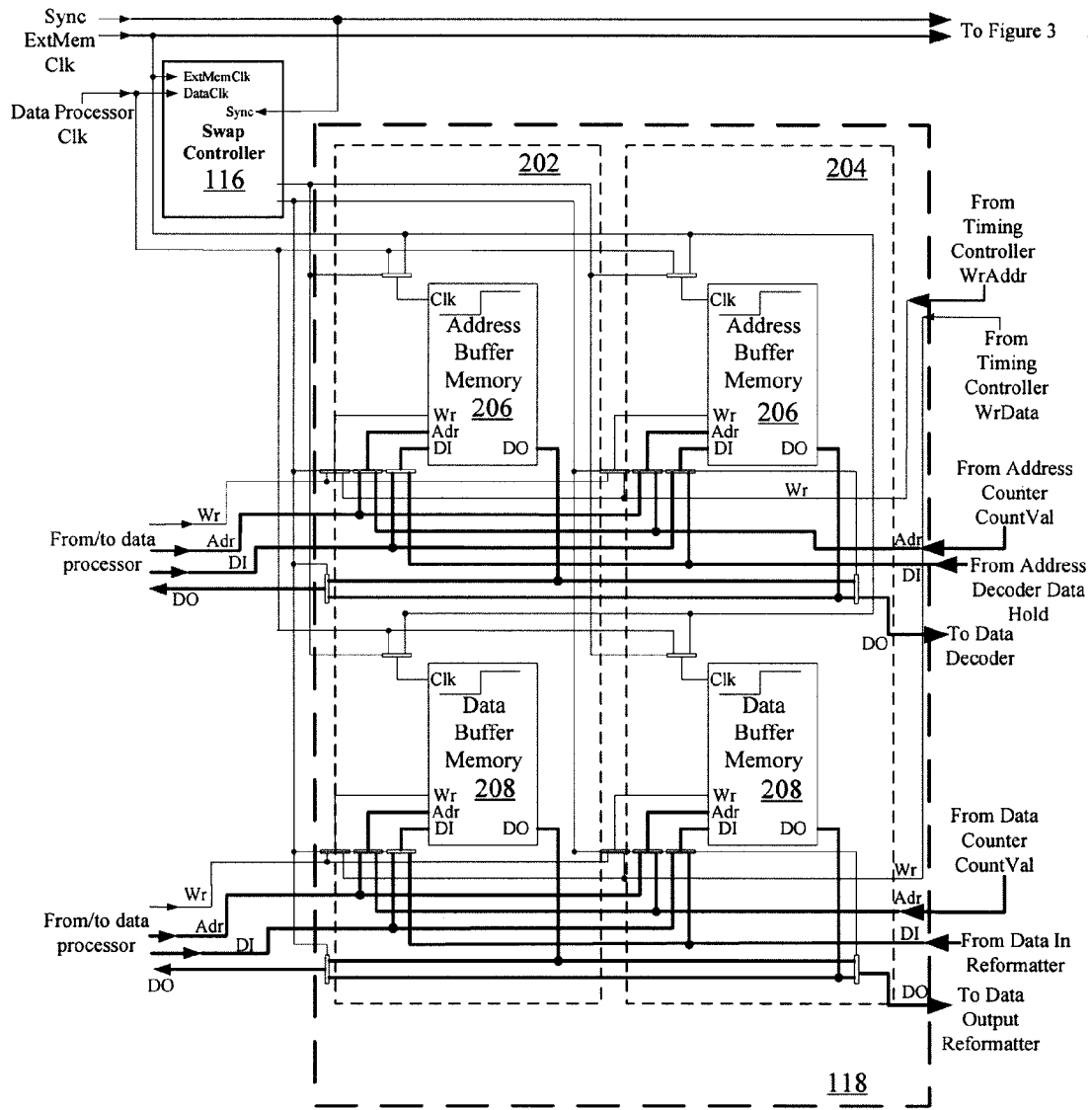
FIG. 2 is a block diagram of a swap controller and memory subsystem of an external memory interface engine.

FIG. 2 is a block diagram of a swap controller and a memory subsystem of an external memory interface engine. In FIG. 2, the swap controller 116 receives multiple clock signals. One clock signal supplied to the swap controller 116 may be the clock signal that drives a data processor while a second clock signal may be the clock signal that drives an external memory. The clock signals may be related to one another and may be a selectable multiple of a sampling rate, such as 44.1 KHz for audio sampling. Although the data processor clock signal and the external memory clock signal may be related to one another, these clock signals may run at different frequencies. Because the clock signal driving the data processor and the clock signal driving an external memory may run at different frequencies, a third clock signal, such as a synchronization signal may be received by the swap controller 116. The synchronization signal may represent the data rate at which digital data is received by the data processor or another processing period, as dictated by a data processor program or a host program running in conjunction with the external memory interface engine, such as a synchronization event. In some systems, the synchronization signal may be the data processor clock signal. In other systems, the synchronization signal may be the external memory clock signal. In yet other systems, the synchronization signal may be a signal unrelated to the data processor clock signal or the external memory clock signal.

The synchronization signal may be used by the swap controller 116 to determine the external memory interface engine's processing period. For instance, the swap controller 116 may analyze the data processor clock signal, the external memory clock signal, and the synchronization clock signal. When the synchronization signal indicates the beginning of a new period (e.g., processing period), the swap controller 116 verifies that neither the data processor 102 nor the external memory 114 is executing an access operation, and swaps the accessibility of the memory subsystem's 118 buffer memories. When the buffer memories are swapped, swap controller 116 may provide a synchronization signal to the external memory controller subsystem. The external memory controller subsystem may use this synchronization signal to clear its associated counters, registers, and/or logic to prepare to process new address information and/or data. In some systems, the external memory control subsystem may use this synchronization signal to increment or decrement its associated counters, registers, and/or logic by a predetermined value to prepare to process new address information and/or data.

In FIG. 2, the memory subsystem 118 includes a first set of buffer memories 202 and a second set of buffer memories 204. Each set of buffer memories 202 and 204 includes an address buffer memory 206 and a data buffer memory 208 that operate together to store address and external memory control information, in an address buffer memory 206, for an external memory 114 and data to be written to or read from that address location. An advantage to using separate buffer memories for address/external memory control information and data is that if a data element exceeds the width of one location in a data buffer memory 208, the remainder of the data element may be stored in another data buffer memory location, without storing multiple addresses for that data element. An additional advantage to using separate buffer memories for address/external memory control information and data is that when a read operation is performed from an external memory, an associated address is not overwritten and is therefore available to the data processor during the subsequent processing period.

Each of the buffer memories included in the memory subsystem 118 are coupled to the swap controller 116, the data processor clock signal, and the external memory clock signal through multiplexers. The multiplexers select between the clock signals used by a buffer memory. Each buffer memory in the first or second set of buffer memories 202 and 204 may use the same clock signal during a particular processing period.

Each buffer memory in the memory subsystem 118 may receive a write signal, an address signal, and/or a data input signal over a bus line. Additionally, a data output signal may be output from a buffer memory across a bus line. Multiplexers may connect similar input and output bus lines from the data processor and the external memory control subsystem such that the accessibility to the sets of buffer memories may be controlled by the swap controller 116.

Figure 3:
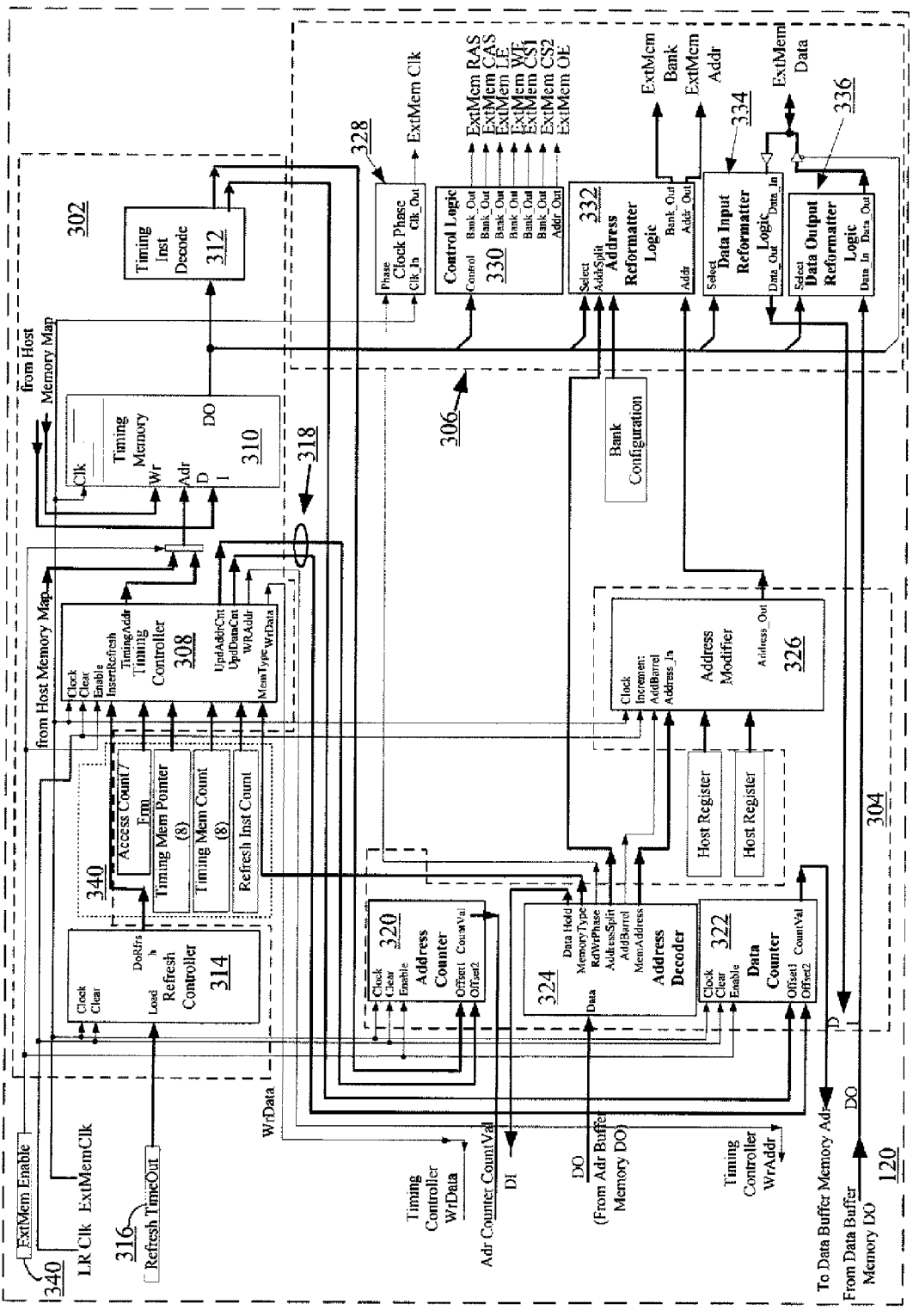
FIG. 3 is a block diagram of an external device control subsystem of an external memory interface engine.

FIG. 3 is a block diagram of an external memory control subsystem. The external memory control subsystem 120 may include a timing section 302, a data section 304, and an access section 306. The timing section 302 may include a timing controller 308, a timing memory 310, a timing instruction decoder 312, and a refresh controller 314.

The timing memory 310 stores instruction data strings related to accessing an external memory. Multiple instruction data strings may be executed in sequence to perform an access to an external memory. The instruction data strings may be loaded into the timing memory 310 by a host upon power up or during a reset/re-initialization command prior to enabling the external memory interface engine. Alternatively, the timing memory may be wholly or partially implemented as a ROM that is preprogrammed with instruction data strings. Each instruction data string may provide control bits used to configure the access section 306 for accessing an external memory. The control bits may represent such control signals as output enable, write enable, column address strobe ("CAS"), row address strobe ("RAS"), latch enable, one or more chip selects, and/or other signals depending on the type of external memory to be accessed.

Based on the type of external memory to be accessed, the access section 306 may extract some or all of the control bits from an instruction data string. The control bits may be extracted on a bit-by-bit basis, or may be decoded through a combination of bits. The size and width of the timing memory 310 may be selected based on a desired implementation. In one implementation, the timing memory 310 may be 128 words deep by 16 bits wide.

The type of memory used for the timing memory 310 may also be selected based on a desired implementation. The timing memory 310 may be Random Access Memory ("RAM") which provides a programmer with flexibility in defining the control bits of the instruction data strings. The control bit definition may vary on a per external memory basis (e.g., the instruction data strings may be programmable). For instance, a programmer may select to use the first bit of the instruction data string for the output enable control signal for a first external memory, such as a SRAM, and may select to use the third bit of the instruction data string for the output enable control signal for a second external memory, such as a DRAM. Additionally, the ability to load customized instruction data strings into the timing memory 310 provides a programmer with the capability of quickly changing the types of external memories connected to the external memory interface engine, or connecting newly designed external memories to the external memory interface engine with a minimal amount of programming changes. Alternatively, the timing memory 310 may be wholly or partially implemented with a ROM which is preprogrammed with instruction data strings.

The refresh controller 314 provides a refresh signal to the timing controller 308. The refresh signal may be used when the external memory control subsystem 120 communicates with a dynamic external memory. Upon expiration of a counter, which may be resident to the refresh controller 314, the refresh controller 314 transmits a refresh signal to the timing controller 308. Upon receipt of the refresh signal, the timing controller 308 pauses operation of the access section 306 and causes a data refresh cycle of the dynamic external memory. After the refresh cycle, the access section 306 resumes operation at the point at which it was paused. The amount of time between transmissions of refresh signals may be controlled by a configurable refresh parameter written to a host register 316 which interfaces with the host. The host may read and write to and from the host register 316, while the refresh controller 314 has read access to the host register 316. The host register 316 may be defined in other memory spaces.

The timing controller 308 may read parameters from one or more host registers 340. In one implementation, the host registers 340 include an enable host register that stores enable data controlling when the external memory interface engine is enabled or disabled. In addition, one or more timing memory host registers, such as eight, may store pointers that identify the starting location within the timing memory 310 of the instruction data strings for a particular operation of a particular external memory. For instance, the contents of a first timing memory host register may point to the starting location in the timing memory 310 where the first customizable instruction data string for a read operation of an external SDRAM is stored. Another timing memory host register may point to the starting location in the timing memory 310 where the first customizable instruction data for a write operation of an external SDRAM is stored. The number of timing memory host registers may be configured based on the number of different types of external memories connected to the external memory interface engine and the number of operations to be performed.

One or more timing memory count host registers, such as eight, may include data defining the number of instruction data strings that are used to perform an operation. For instance, a timing memory count host register associated with a DRAM read operation may specify that 12 instruction data strings define the read operation. Through the combination of the timing memory host registers and the timing memory count host registers, the timing controller 308 may identify the location and number of instruction data strings, stored in the timing memory 310, for reading data from a DRAM external memory. The timing controller 308 may provide this information to the timing memory 310 on a timing address bus. Other host registers may contain other configuration parameters, such as the number of instructions to perform during a refresh cycle, the number of access during a processing period or a portion of a processing period, or other interface engine related parameters.

The timing controller 308 may provide an update address counter signal and/or an update data counter signal on the bus lines 318 to the data section 304. The update address counter signal and update data counter signals may increment or decrement the address counter 320 and/or the data counter 322 by one or more locations to indicate the next location within the buffer memories that the external memory control subsystem 120 should access.

The data section 304 may include the address counter 320, the data counter 322, address decoder 324, and an address modifier 326. The address counter 320 is a counter configured to indicate an address storage location within the buffer memory set that is accessible to the external memory control subsystem 120. Similarly, the data counter 322 is a counter configured to identify a data storage location with the buffer memory set that is accessible to the external memory control subsystem 120.

The external memory address counter 320 and the external memory data counter 322 may be configured to receive an offset value from the timing instruction decoder 312. The offset value output by the timing instruction decoder 312 may be configured through one or more control bits of an instruction data string. When enabled, the offset value may increment or decrement the counters in the address counter 320 and/or the data counter 322 by one or more numerical values.

Address/external memory control information and data output by a buffer memory set accessible by the external memory control subsystem 120 is provided to the address decoder 324 and the access section 306, respectively. Address/external memory control information and data output by a buffer memory set to the data processor is provided through data output buses to the data processor where it may be stored, further processed, and/or transmitted to another device.

The address decoder 324 may be logic configured to receive address/external memory control information output from a buffer memory accessible by the external memory control subsystem 120. The received address information may be decoded to separate out an external memory address and control information. Some or all of the external memory control information may be provided to the timing section 302 and/or the access section 306. The address decoder 324 may obtain the external memory control information by selecting specific bits or by decoding a predetermined combination of bits from the address/control information received. The external memory control information may include an offset signal to be added to or subtracted from the external memory address, an address split signal which may be used to split an external memory address at a specific bit location (such as to obtain a low, medium, and/or high address if required by a specific external memory), a read/write phase signal which may be used to control whether a read/write operation for a synchronous external memory occurs on a positive or negative clock cycle, and/or a memory type pointer used to identify which timing memory host registers 340 should be used by the timing controller 308. Additionally, the address decoder 324 may include and/or have access to a register location that may store data which may be used to dynamically update a data buffer memory accessible by the external memory control subsystem 120.

The external memory address may be provided to an address modifier 326. The address modifier 326 may enable the implementation of a circularly addressable memory space within an external memory. The address modifier 326 may modify the information representing the external memory address by adding or subtracting an offset value at the beginning of a new processing period or during a processing period. The address modifier 326 may include logic such that when an offset value is added to or subtracted from the external memory address, the modified external memory address does not store data into another memory space. The logic may include hardware and/or software that checks to make sure the memory is wrapped around when a circularly memory space is to be implemented. Alternatively, if no modification is required, the address modifier 326 may pass the received address data through to the access section 306.

The access section 306 may include clock phase logic 328, control logic 330, address reformatter logic 332, data input reformatter logic 334 and data output reformatter logic 336. The clock phase logic 328 may be employed when communicating with a synchronous external memory. The clock phase logic 328 may generate an external memory clock signal based on read/write phase signal of the address decoder 324 and the external memory clock signal received by swap controller 116. Based on the read/write phase signal, the clock phase logic 328 may generate an output external memory clock signal that is the inverse of the input external memory clock signal, or that is a modified or delayed version of the input external memory clock signal.

The control logic 330 may extract control bits from the instruction data strings output by the timing memory 310. The control logic 330 may use the extracted control bits to generate signals for accessing the external memory. The control bits output by the control logic 330 may be derived from the bits of an instruction data string, or may be decoded from a combination of instruction data string bits. The address reformatter logic 332 may receive the external memory address data (or modified external memory address data, if modified), as well as optional control data. The control data may be used if the external memory address is to be split, or if the external memory identifies its memory locations on an address and sub-address basis (e.g., bank configuration). The address reformatter logic 332 may split the external memory address into smaller sections, if necessary. Bank configuration may be supplied to the address reformatter logic by a bank configuration host register. If the external memory address does not need to be reformatted, the address reformatter logic 332 may operate as flow through logic.

The data input reformatter logic 334 may receive one or more control bits and may pass data received from an external memory to an external memory control system 114 accessible buffer memory set. Data may be received at the data input reformatter logic 334 when data is being read from an external memory. Because the width of data used by an external memory may differ from the width used by the data processor, data input reformatter logic 334 may reformat received data to a different width. Reformatting may include splitting received data into smaller sections, concatenating multiple received data portions to form a data element with a larger section, or passing through the data received.

The data output reformatter logic 336 may receive one or more control bits and may pass data received from an external memory control system 120 accessible buffer memory set to an external memory. Because the width of data used by an external memory may differ from the width used by the data processor, data output reformatter logic 336 may reformat received data to a different width. Reformatting may include splitting received data into smaller sections, concatenating multiple received data portions to form a data element with a larger section, or passing through the data received.

The data input reformatter logic 334 and the data output reformatter logic 336 may both be coupled to a bidirectional bus that is coupled to an external memory. A control bit output from the timing memory 310 may be used to select which reformatter logic is connected to the bidirectional bus during a particular instruction.

Figure 4:
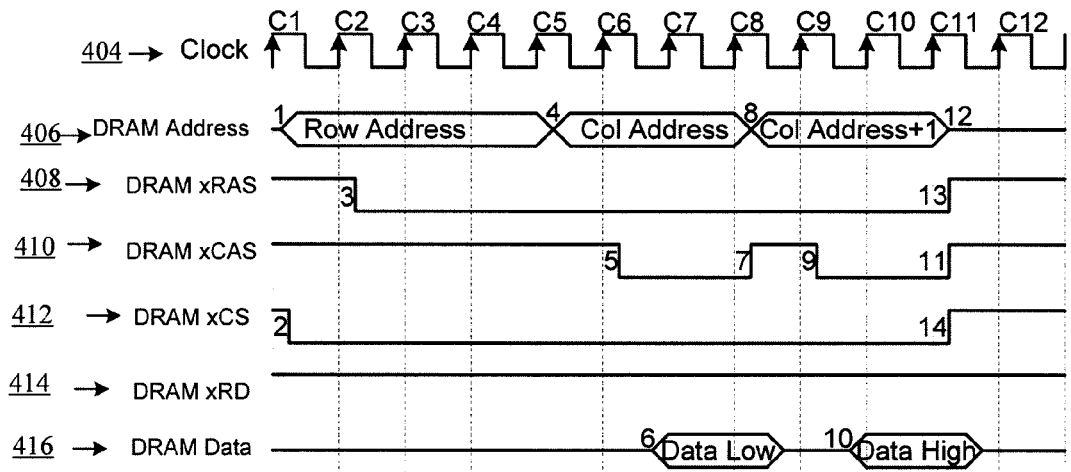
FIG. 4 is a memory timing diagram and instruction data set.

FIG. 4 shows an exemplary timing diagram and instruction set for reading data from an external memory, such as a DRAM. As shown in FIG. 4, the following instruction set 400 is performed: (1) Drive row address, (2) Drive xRD and xCS, (3) Drive RAS, (4) Drive Column Address, (5) Drive CAS, (6) Drive Data, (7) Release CAS, (8) Drive Column Address, (9) Drive CAS, (10) Read Data, (11) Release CAS, (12) Release Column Address, (13) Release RAS, and (14) Release xRD and xCS.

In FIG. 4, the timing diagram 402 shows the timing configuration of control bits (406-414) that may be included as part of an instruction data string stored in the timing memory. DRAM data 416 represents when during the timing diagram the data is read. Clock signal 402 is shown being trigger on a rising edge. Therefore, the control bits transition at substantially the same time as the clock signal's rising edge. Alternatively, the instruction set may be processed on a falling edge of the clock signal.

In addition to the control bits 406-414, the instruction data string may include control bits that may be used by other components of the external memory control subsystem, such as the address reformatter logic, the address counter, the data input reformatter logic, and the data counter. Tables 3-6 show exemplary control bits for these components as well as exemplary operations.

TABLE 3

Address Reformatter Logic Control Bits

| Control Bits | Operation |
| --- | --- |
| 00 | Release address bus |
| 01 | Drive row address |
| 10 | Drive column address |
| 11 | Drive column address + 1 |

TABLE 4

Address Counter Control Bits

| Control Bits | Operation |
| --- | --- |
| 000 | No offset |
| 001 | Start central processing unit request |
| 010 | stop central processing unit request |
| 011 | Reserved |
| 100 | Address buffer position + 1 |
| 101 | Address buffer position + 3 |
| 110 | Address buffer position − 1 |
| 111 | Address buffer position − 3 |

TABLE 5

Data Input Reformatter Logic Control Bits

| Control Bits | Operation |
| --- | --- |
| 000 | No operation |
| 001 | Read data 8 bits |
| 010 | Read low data 16 bits |
| 011 | Read high data 16 bits |
| 100 | Write data to buffer 8 bits |
| 101 | Write data to buffer 32 bits |
| 110 | Reserved |
| 111 | Reserved |

TABLE 6

Data Counter Control Bits

| Control Bits | Operation |
| --- | --- |
| 00 | No offset |
| 01 | Data buffer position + 1 |
| 10 | Data buffer position − 1 |
| 11 | reserved |

To read from a DRAM external memory, the instruction data strings shown in table 7, which correspond to instruction set 400, may be stored in the timing memory. When the DRAM read is to be performed, the timing controller may use the timing memory pointer and timing memory counter to determine where in the timing memory these instruction data strings are stored. The timing memory may process the instruction data strings sequentially until completion of the operation.

TABLE 7

Instruction Data String

| Clock Cycle | Data Counter Control Bits | Address Counter Control Bits | Data Input Reformatter Logic Control Bits | Address Reformatter Logic Control Bits | CAS | RAS | WE | CS1 |
|---|---|---|---|---|---|---|---|---|
| 1 | 00 | 000 | 000 | 01 | 1 | 1 | 1 | 0 |
| 2 | 00 | 000 | 000 | 01 | 1 | 0 | 1 | 0 |
| 3 | 00 | 000 | 000 | 01 | 1 | 0 | 1 | 0 |
| 4 | 00 | 000 | 000 | 01 | 1 | 0 | 1 | 0 |
| 5 | 00 | 000 | 000 | 10 | 1 | 0 | 1 | 0 |
| 6 | 00 | 000 | 000 | 10 | 0 | 0 | 1 | 0 |
| 7 | 00 | 000 | 000 | 10 | 0 | 0 | 1 | 0 |
| 8 | 00 | 000 | 010 | 11 | 1 | 0 | 1 | 0 |
| 9 | 00 | 000 | 000 | 11 | 0 | 0 | 1 | 0 |
| 10 | 00 | 000 | 000 | 11 | 0 | 0 | 1 | 0 |
| 11 | 00 | 000 | 011 | 00 | 1 | 1 | 1 | 1 |
| 12 | 01 | 001 | 101 | 00 | 1 | 1 | 1 | 1 |

Figure 5:
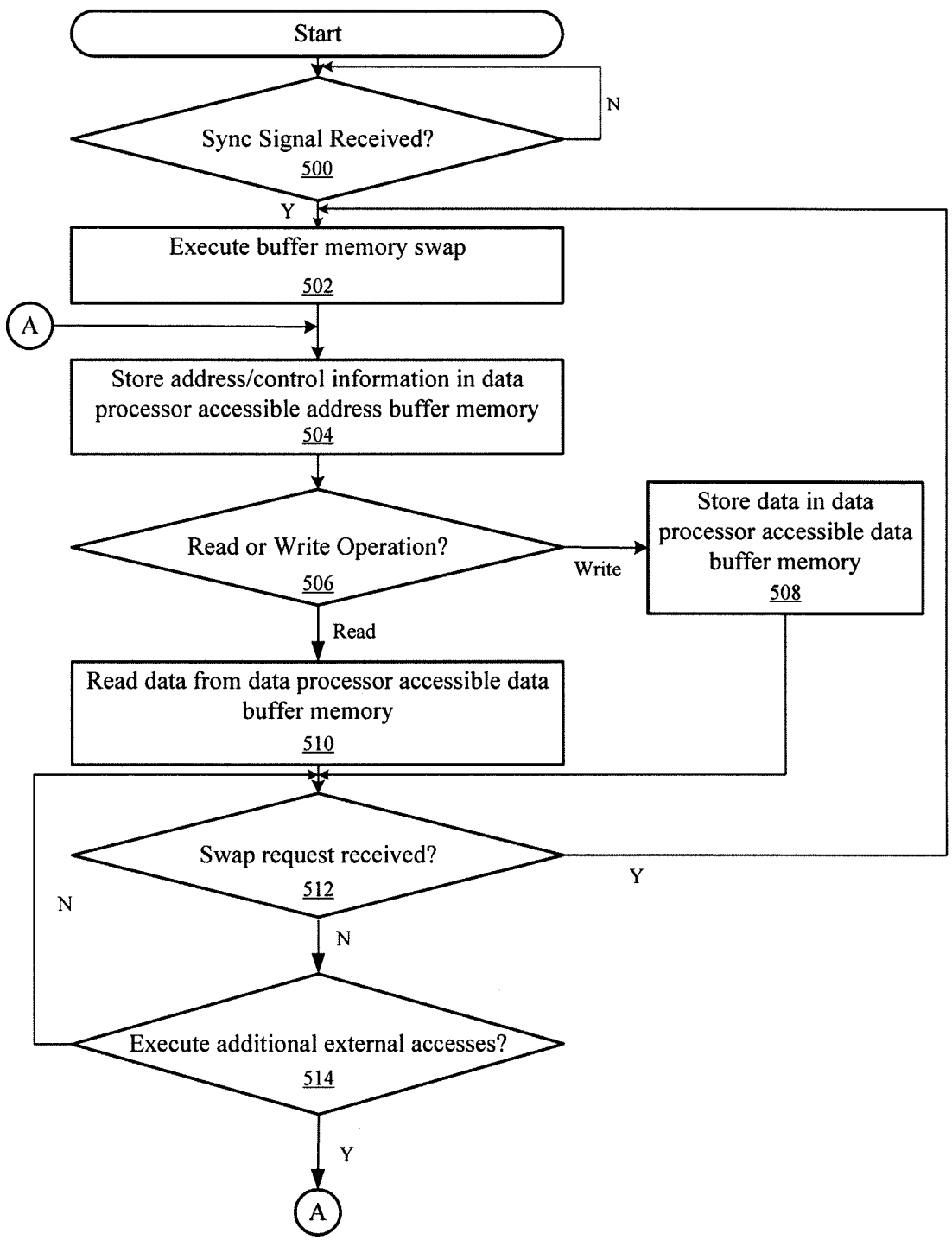
FIG. 5 shows the acts taken by a data processor to access a data processor accessible buffer memory.

FIG. 5 shows the acts taken by a data processor to access a data processor accessible buffer memory. A check may be performed to determine if a new processing period indicator (e.g., a synchronization signal) has been received (act 500). When a synchronization signal is detected, a buffer memory set swap occurs coupling the data processor to a buffer memory set that was accessible by the external memory control subsystem during the previous processing period (act 502). When the buffer memory swap occurs, a clear signal may be transmitted to the external memory control subsystem indicating that counters and clearable registers should be cleared in anticipation of receiving new information.

Address/external memory control information provided by the data processor is stored in an address memory space of the buffer memory set accessible by the data processor (act 504). This address/external memory control information will be for a future operation because before the operation (read or write) can be executed, the buffer memory sets must swap and this information must be provided to the external memory control subsystem.

A check may be performed by the data processor to determine if data will be written to or read from an external memory (act 506). If the data processor has data associated with the address stored in the address memory space at act 504, the data processor is preparing to write this data to an external memory. This data is stored in a data memory space of the buffer memory set accessible by the data processor (act 508) and is associated with the address stored at act 504. During the next processing period, this data will be accessible by the external memory control subsystem and will be stored in an external memory.

If the data processor does not have data associated with the address stored in the address memory space at act 504, the address stored at act 504 represents a future read request. At substantially the same time the address is stored at act 504, or in delayed time, the data processor may perform a read operation from the data processor accessible buffer memory set (act 510). The data read from the data processor accessible buffer memory set corresponds to a read request that was stored in the accessible address buffer memory two processing cycles earlier. The buffer memory set has access to this data because the location in which the data is stored is associated with the address that was stored in the address memory space two processing cycles earlier.

The two processing cycle lag results from swapping the buffer memory sets. For instance, a read request is stored in an address memory space during processing period n. During processing period n+1, the buffer memory sets are swapped, this read request is accessible by the external memory control subsystem, the corresponding data is read out of the external memory and stored in a data memory space accessible by the external memory control subsystem. During the next processing period, n+2, the buffer memory sets swap again, and the data retrieved from the external memory is now accessible by the data processor.

The external memory interface engine may check to see if a swap request, such as a synchronization signal, has been received (act 512). Determination of a swap request may be performed by the swap controller analyzing the synchronization signal. If the swap controller determines that a swap request was received (e.g., a transitioning synchronization signal) a buffer memory swap may be performed (act 502), and the process of FIG. 5 continues.

If a swap request has not been received, the data processor may check to see if there are additional external accesses to be performed (act 514). If additional external accesses exist, the process may restart at point "A." If no additional external accesses exist, the data processor may remain idle with respect to external access operations and the external memory interface engine may continue to check if a swap request has been received.

Address/external memory control information read from or written to a buffer memory set by the data processor may be transmitted through either a serial or parallel process. Similarly, data read from or written to a buffer memory set by the data processor may be transmitted through either a serial or parallel process.

Figure 6:
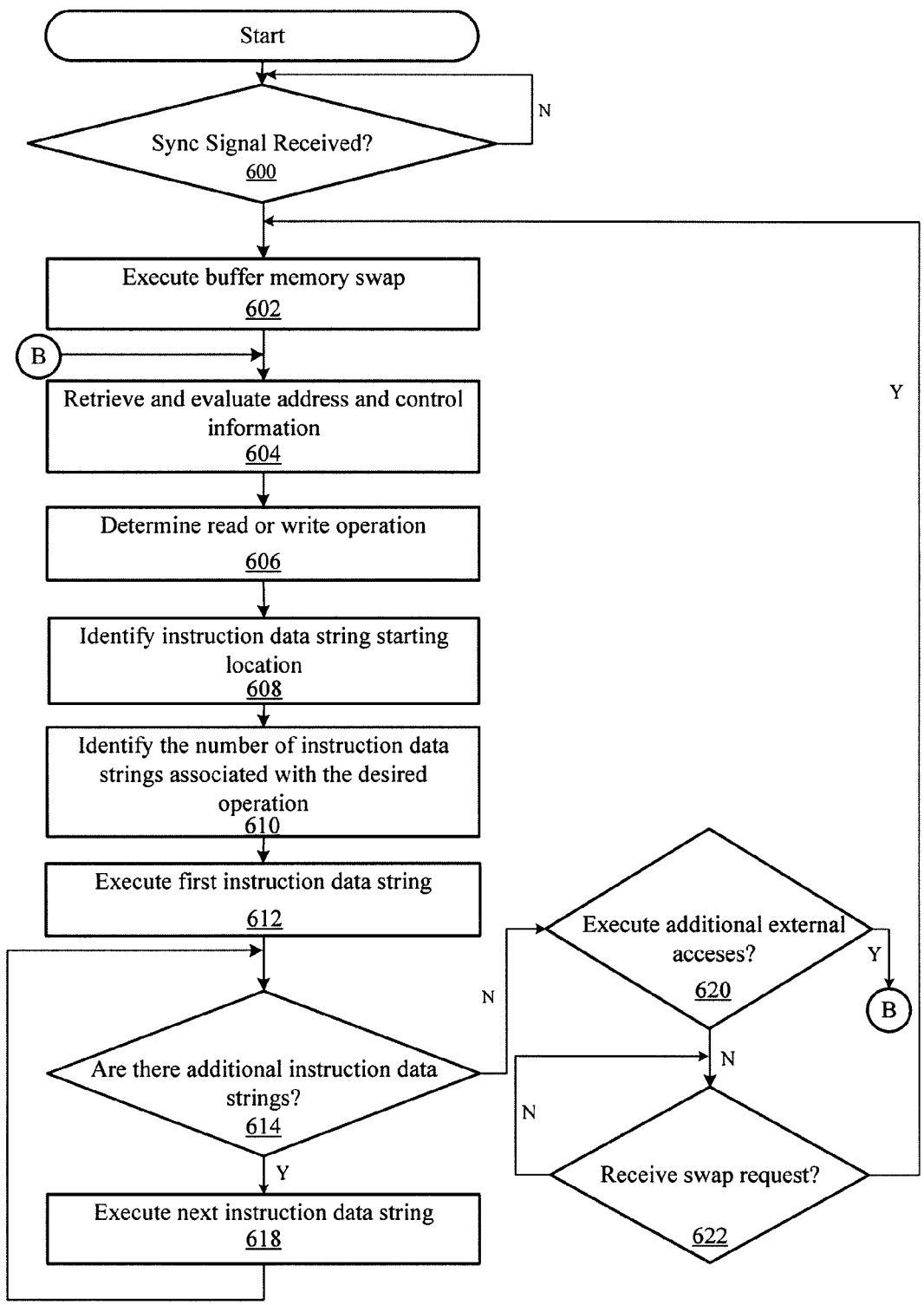
FIG. 6 shows the acts taken by an external memory interface engine to implement an access to an external memory.

FIG. 6 shows the acts taken by an external memory interface engine to implement an access to an external memory. A check may be performed to determine if a new processing indicator (e.g., a synchronization signal) has been received (act 600). When a synchronization signal is detected, a buffer memory set swap occurs coupling the external memory device control subsystem to a buffer memory set (act 602). When the buffer memory swap occurs, a clear signal may be transmitted to the external memory control subsystem indicating that counters and clearable registers should be cleared in anticipation of receiving new information.

The external memory control subsystem retrieves and evaluates address/external memory control information from the address buffer memory to which it has access (act 604). The external memory control subsystem may decode the retrieved external memory control information to determine external memory related information, such as the type of external memory to access, external memory address formatting information, and/or other external memory control information.

The external memory control subsystem may decode the retrieved external memory control information to determine whether to perform a read or write operation (act 606). Based on the type of external memory to be accessed and the operation to be performed, the starting location of instruction data strings in the timing memory are identified (act 608), such as by a timing controller's use of one or more of the host registers. Additionally, based on the type of external memory to be accessed and the operation to be performed, the numbers of instructions involved in the operation are identified (act 610), such as by information stored in one or more of the host registers.

The first instruction data string is executed by the external memory control subsystem (act 612). A check may be performed by the timing memory to see if the number of executed instruction data strings is less than the number of instruction data string involved in the operation (act 614). Additional instruction data strings may be executed (act 618). When no additional instruction data strings exist, the external memory control subsystem may determine whether there are additional external accesses to perform (act 620).

If additional external accesses exist, the process may restart at point "B." If no additional external accesses exist, the external memory interface engine may check to see if a swap request, such as a synchronization signal, has been received (act 622). Determination of a swap request may be performed by the swap controller analyzing the synchronization signal. If the swap controller determines that a swap request was received (e.g., a rising synchronization signal) a buffer memory swap may be performed (act 602), and the process of FIG. 6 continues. If no swap request has been received, the external memory control subsystem may remain idle and the external memory interface engine may continue to check if a swap request has been received.

Address/external memory control information read from or written to a buffer memory set by the external memory control subsystem may be transmitted through either a serial or parallel process. Similarly, data read from or written to a buffer memory set by the external memory control subsystem may be transmitted through either a serial or parallel process.

The external memory interface engine shields the data processor from external memory imposed time delays. As configured, the data processor communicates with a buffer memory set, instead of directly communicating with an external memory. Accordingly, the data processor communicates with the one or more buffer memories such that a write operation to an external memory will occur during the next sample cycle, and data to be retrieved from the external memory will be provided back to the data processor two sample cycles later. Because the data processor does not communicate directly with the external memory, the data processor can continue to perform read and write operations to a buffer memory instead of remaining in a wait state while an external memory executes its operations.

Figure 7:
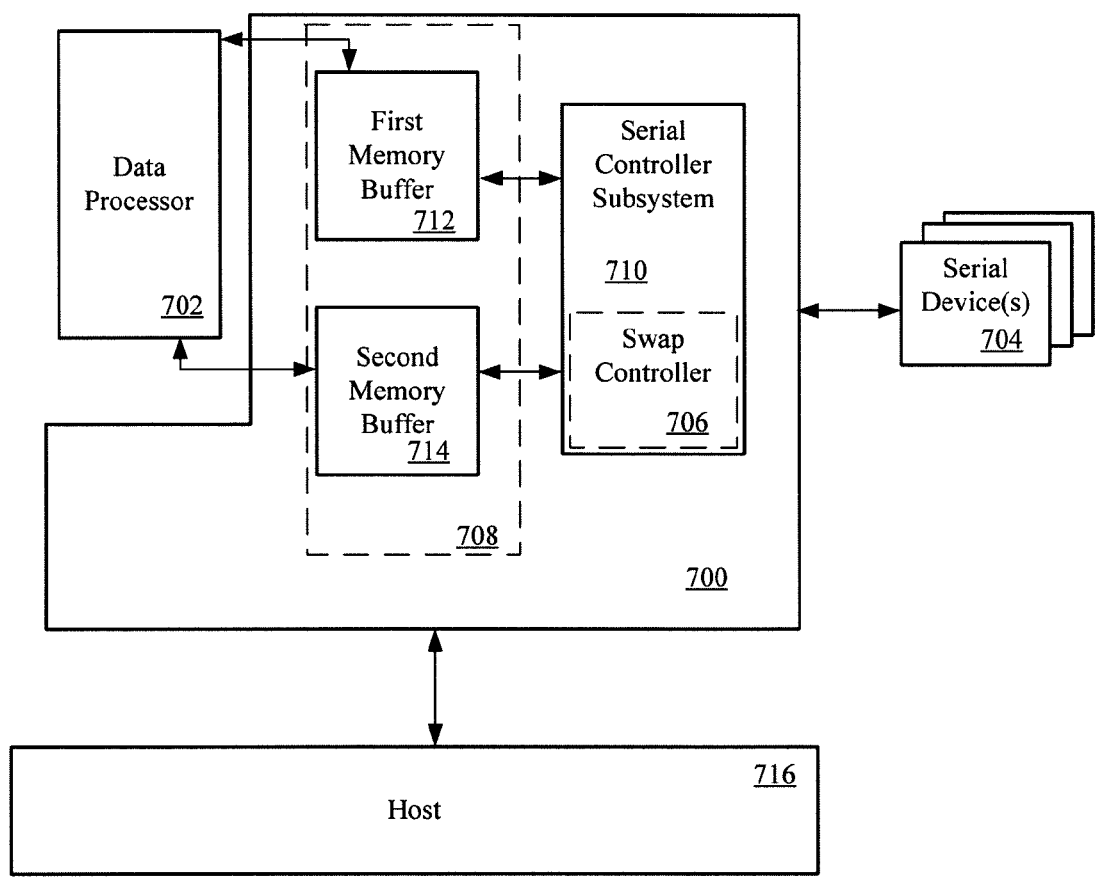
FIG. 7 is a block diagram of a serial communication input output interface engine.

FIG. 7 shows a block diagram of a serial communication input output ("I/O") interface engine. The serial communication I/O interface engine 700 may encompass hardware and/or software that are capable of running on one or more processors in conjunction with one or more operating systems. The serial communication I/O interface engine 700 may be used to serially transfer data (e.g., send or receive) between a data processor 702 and one or more serial device 704. The serial device 704 may be a digital signal processor, an analog to digital converter, a digital to analog converter, or other external processor, a microcontroller, embedded controller, a general purpose processor, or other type of processor. Additionally, the serial communication I/O interface engine may communicate with a host 716. The serial communication I/O interface engine 700 may include a swap controller 706, a memory subsystem 708, and a serial controller subsystem 710.

The memory subsystem 708 may include a set of buffer memory spaces. The set of buffer memory spaces may include a first buffer memory 712 and a second buffer memory 714. The buffer memories may be partitioned into separate memory spaces, with each partition of a memory space being associated with one of multiple shift registers, as will be explained later.

The buffer memories 712 and 714 store data which is processed by the serial controller subsystem 710 when a transfer to/from a serial device 704 is performed. During a processing period, one of the buffer memories is accessible by the data processor 702 while the other buffer memory is accessible by the serial controller subsystem 704.

The swap controller 706 may control the communication paths between the buffer memories, the data processor 702, and the serial controller subsystem 710, which may also communicate with a serial device 704. More specifically, the swap controller 706 may control which buffer memory is accessible by the data processor 702 and by the serial controller subsystem 706. At the beginning of a new processing period, the swap controller 706 may swap the communication paths between the data processor 702, the serial controller subsystem 710, and the buffer memories, such that a buffer memory that was previously accessible to the data processor 102 is now accessible to the serial controller subsystem 710 and vice-versa. Table 8, below shows the accessibility of the first and second buffer memories 712 and 714 for four different processing periods.

TABLE 8

| Processing Period | First buffer memory accessible by: | Second buffer memory accessible by: |
| --- | --- | --- |
| 1 | Data processor | Serial controller subsystem |
| 2 | Serial controller subsystem | Data processor |
| 3 | Data processor | Serial controller subsystem |
| 4 | Serial controller subsystem | Data processor |

For instance, during a first processing period, the first buffer memory 712 is accessible by the data processor and the second buffer memory 714 is accessible by the serial controller subsystem 710, which may also communicate with a serial device 704. During this first processing period, the data processor 702 may execute a transfer operation with respect to the first buffer memory 712 while the serial controller subsystem 710 may use data stored in the second buffer memory 714 to execute a transmission operation to the serial device 704. At the beginning of the second processing period, the swap controller 706 switches the accessibility of the first and second buffer memories, 712 and 714. Data that was stored in the first buffer memory 712 during the first processing period may be transmitted to the serial device 704, via the serial controller subsystem 710, during the second processing period. Accordingly, the data processor 702 and the serial device 704 may exchange data without directly communicating with one another.

In FIG. 7, swap controller 706 is shown integrated into the serial controller subsystem 710. In an alternative implementation, swap controller may be discrete from the serial controller subsystem 710 and may be coupled to the memory subsystem 708 and the serial controller subsystem 710. In yet another alternative, the serial controller subsystem 710 may perform the operations of the swap controller 706.

The data stored in the buffer memories 712 and 714 may be digital samples of an audio signal, such as samples received from an analog to digital converter, or any other type of digital data. Each of the buffer memories 712 and 714 may vary in size and width. In one implementation, the buffer memories 712 and 714 may be 64 words deep by 32 bits wide. In other implementations, the buffer memories may be separate memories spaces of a dual port memory, or may be implemented in other manners.

Figure 8:
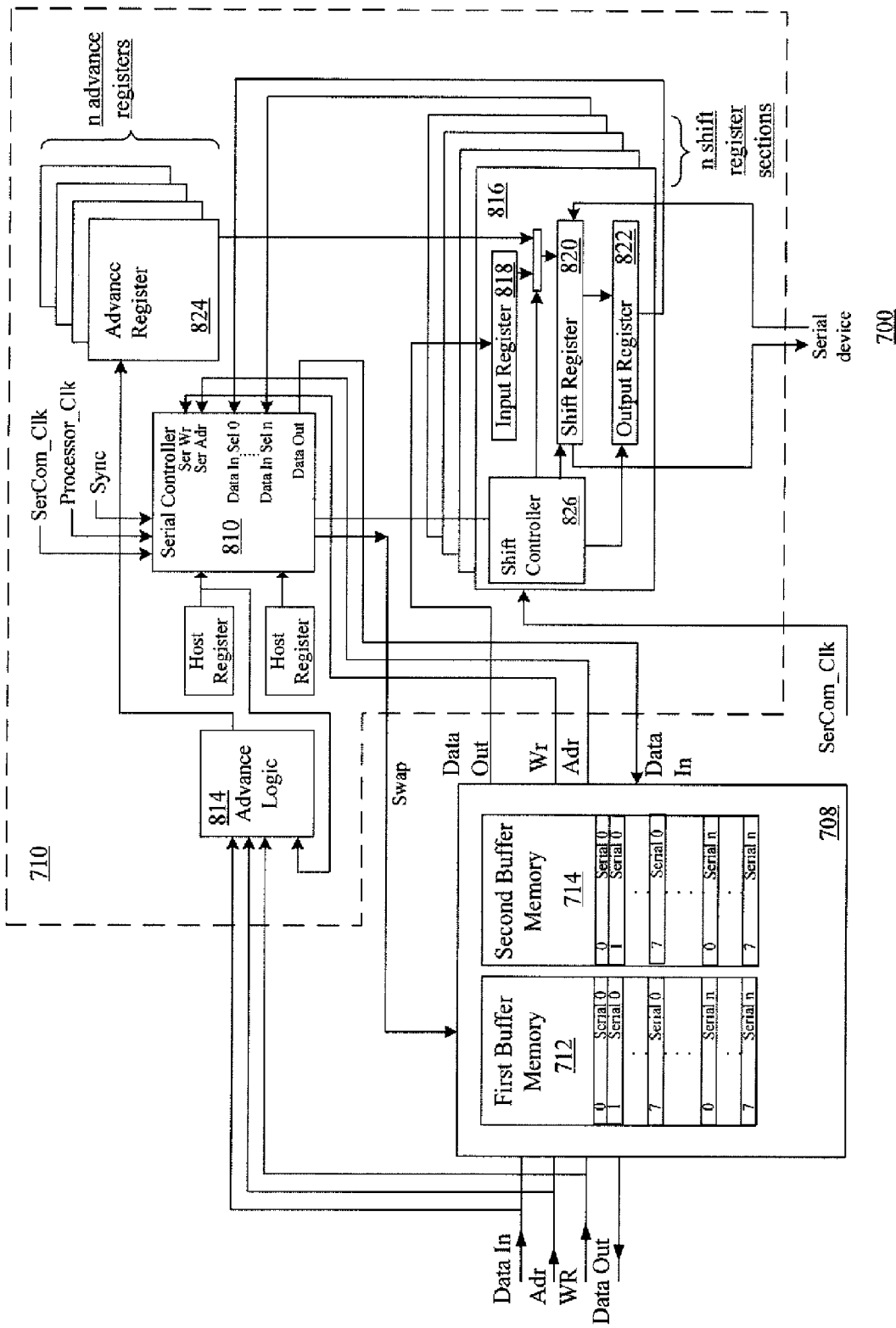
FIG. 8 is an alternate block diagram of a serial communication input output interface engine.

FIG. 8 is an alternative block diagram of a serial communication I/O interface engine 700. The serial controller 810 controls the swapping of the buffer memory communication paths that may otherwise be controlled by a swap controller. Accordingly, the serial controller 810 receives multiple clock signals. One clock signal supplied to the serial controller 810 may be the clock signal that drives the data processor 702, while a second supplied clock signal may be the clock signal that drives the serial device 704. Because the clock signal driving the data processor 702 and the clock signal driving the serial device 704 may run at different frequencies, a third clock signal, such as a synchronization signal may also be received by the serial controller 810. The synchronization signal may represent the data rate at which data is received by the data processor 702, or another processing period as dictated by a data processor program or host program running in conjunction with the serial communication I/O interface engine 700, such as a synchronization event.

The synchronization signal may synchronize the operation of the serial communication I/O interface engine between the data processor clock signal and the serial device clock. The serial controller 810 may analyze the data processor clock signal, the serial device clock signal, and the synchronization signal. When the synchronization signal indicates the beginning of a new processing period, the serial controller 810 verifies that no accesses to the buffer memories are pending, and swaps the accessibility of the memory subsystem's 708 buffer memories. Configuration information may be supplied to the serial controller 810 by one or more host registers which may be defined in another memory space.

The serial controller subsystem 710 may be coupled to the memory subsystem 708, and more specifically to the first and second buffer memories 712 and 714. Additionally, the serial controller subsystem 710 may include advance logic 814, and one or more (e.g., 8) shift register sections 816. The advance logic 814 may comprise combination logic configured to identify a particular memory address location and may capture the data stored in that memory location. In some systems, the advance logic 814 may identify address locations separated by a predetermined amount. For example, the advance logic 814 may be configured to identify every 8th memory address location (e.g., the 0th memory address location, 7th memory address location, and the 15th memory address location—for a memory that has 16 memory locations numbered using a zero based system). Other configurations may be contemplated depending on the implementation desired. Each shift register section 816 may be coupled to a bidirectional serial communication port that connects to a serial device. The serial communication port may be configured as either a transmitter or a receiver. In some applications, the serial communication port may transmit and/or receive serial data that is multiple bits wide. In some systems, the data transmitted through and/or received at a serial communication port may be four bits wide.

Each shift register section 816 includes an input register 818, a shift register 820—such as a staging register which may store data to be transmitted later, an output register 822, an advance register 824, and a shift controller 826. The shift controller 826 may receive the highest available serial clock signal that is driving a serial device 704 which may be the same serial clock signal that is received by the serial controller 810. The shift controller 826 may operate at the rate of the received serial clock signal, or may divide this signal down to a lower rate, such as half rate, quarter rate, or one eighth rate. The shift controller 826 is coupled to the shift register 820 and the output register 822 and provides the whole or divided clock signal to these registers. Because there may be multiple shift register sections 816, each shift controller 826 in a shift register section 816 may be configured to operate at a different rate.

When a serial communication port is configured as a transmitter, the shift register section 816 is configured to transmit data to a serial device. In this configuration, the input register 818 may load a channel of data into the shift register 820 in a parallel load, such that the data, for example a word 32 bits wide, may be loaded into the shift register 820 at one time. In some applications, the shift register 820 may process bits starting with the most significant bit ("MSB") (e.g., the left most bit of the data string) and shift out bits one at a time until the least significant bit ("LSB") (e.g., the right most bit of the data string) is shifted out. In other applications, the shift register 820 may process the LSB bit first and shift out bits until the MSB is shifted out.

When a serial communication port is configured as a receiver, the shift register section 816 is configured to receive data from a serial device. In this configuration, the shift register may receive bits one at a time until a full value, such as 32 bits have been received.

Once the shift register 820 has received a full value (e.g., 32 bits), the shift register 820 may output its contents in a parallel load into the output register 822. When this parallel shift occurs, the entire contents of the shift register 820 are transferred to the output register 822 at one time. Each output register 820 of the one or more serial register sections 816 may be coupled to the serial controller 810 through data input buses, and coupled to the buffer memories through a data output bus.

Once the full value is transferred to the output register 822, the serial controller 810 may multiplex a data input bus from one of the output registers 822 with the serial controller's 810 data output bus. As the serial controller 810 cycles through each output register 822 of the one or more serial register sections 816 the data from the output register 822 is written to the buffer memory that is accessible to the serial controller subsystem 710. At the conclusion of the processing period, the buffer memories may swap accessibility, and a data processor will have access to this data while any data written into the buffer memory during the last processing period by the data processor may now be used to perform a transmission (e.g., send) operation to a serial device.

When many serial communication ports are configured as receivers, the buffer memory swap may undergo a momentary delay as a result of the serial controller 810 transferring the data from the output registers 822 to the serial controller subsystem accessible buffer memory. As a result, the shift registers 820 configured as transmitters during the next processing period may receive the data to be transmitted after the momentary delay. To alleviate the possibility of this momentary delay, the advance logic 814 may monitor when the data processor writes data to a buffer memory for each of the shift register sections 816. More specifically, the advance logic 814 monitors when data is written by the data processor to a predetermined location of a buffer memory space associated with one of the shift register sections 816. In some systems, the predetermined location may be a first position of a buffer memory space (e.g., a zero position). In other systems, the predetermined location may be positions separated by a predetermined amount, such as every fourth position of a buffer memory space (e.g., a zero position, a 3rd position, and a 7th position—for a memory that has 8 memory locations numbered using a zero based system). The data in the predetermined location may be transmitted by the serial controller subsystem 710 at the beginning of a processing period or a synchronization event. When the advance logic 814 determines that the data processor has written data a predetermined location of a buffer memory space, the advance logic 814 causes this same data to be written to an associated advance register 824. There may be one advance register for each shift register section 816.

Advance registers 824 are always accessible to the associated shift register section 816, and therefore the associated shift register 820. Because the data stored in an advance register 824 is the first data that will be serially transmitted at the start of a processing period, the associated shift register 820 may receive this data in parallel when the serial controller 810 identifies a new processing period, such as from the synchronization signal. If the swap process encounters a momentary delay, this momentary delay will not effect the transmission of a first data element to be transmitted by the shift registers. During the time period that the first data element is serially transmitted, the receive channel processing (e.g., the transferring of the received data from the output register to the serial controller accessible buffer memory) will be completed, the buffer memories will swap their accessibility, and the next data element to be transmitted to a serial device will be accessible by the associated shift register sections 816.

Figure 9:
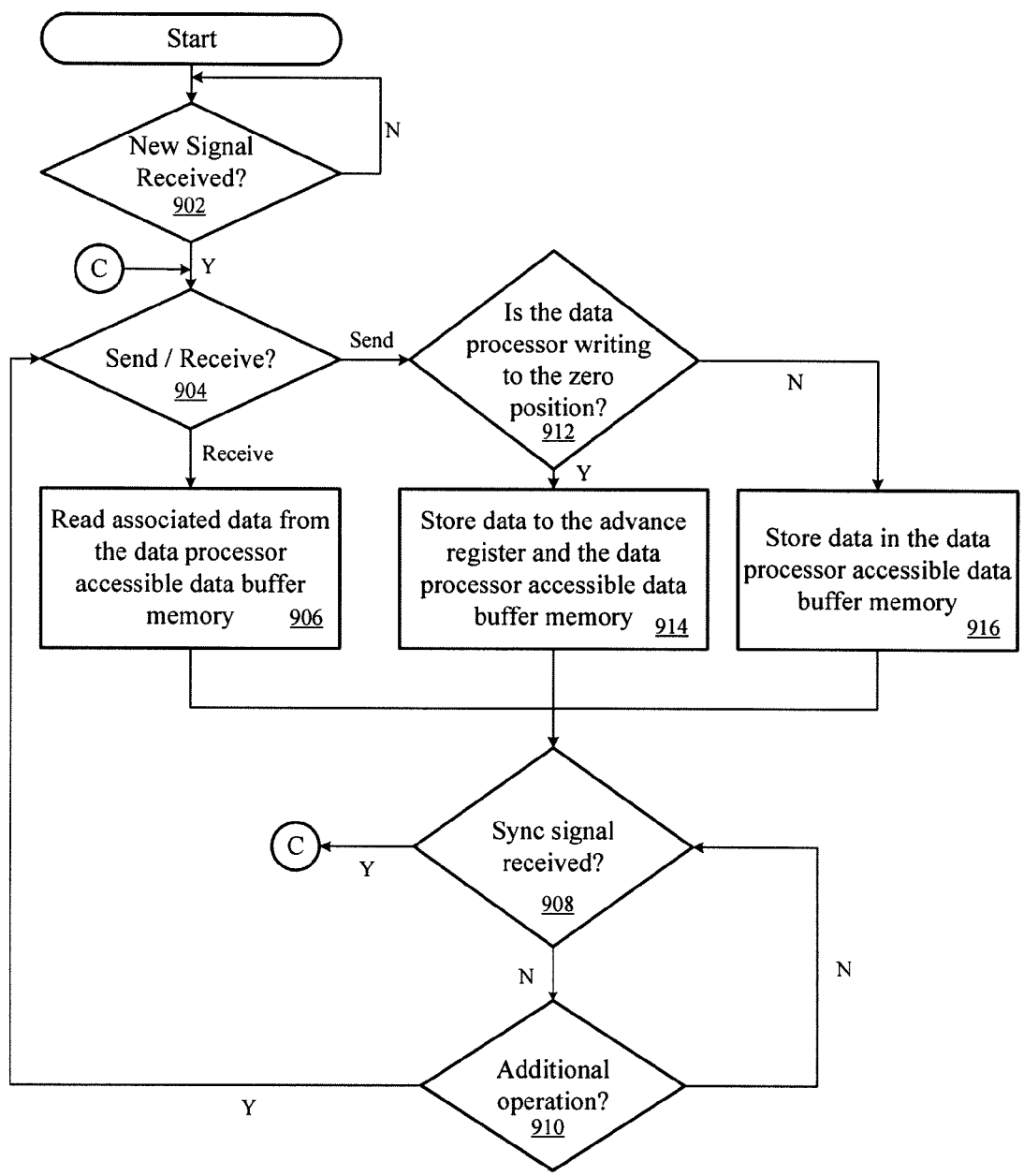
FIG. 9 shows the acts taken by a data processor and a serial controller subsystem to access a data processor accessible buffer memory.

FIG. 9 shows the acts taken by a data processor and serial controller subsystem to access a data processor accessible buffer memory. The data processor receives an indication that a new processing period has begun (act 902). This indication may be the result of a synchronization signal transition. A check may be performed by the data processor to determine whether data should be sent to or received from a serial device via the buffer memory (act 904). If data is to be received, the data processor may read the data from a data processor accessible buffer memory (act 906). The data processor accessible buffer memory is the buffer memory that was accessible to the serial controller subsystem during the preceding processing period.

At act 908, the data processor may determine if a new processing period indicator has been received. If a new processing period indicator has been received, the process of FIG. 9 may return to point "C." If a new processing period indicator has not been received, the data processor may check if there is an addition transfer to perform (act 910). If there is an additional transfer to perform, the data processor may determine whether data is to be sent to or received from a serial device (act 904). If there are no additional transfers to perform, the data processor may remain in an idle state with respect to transfer operations until a new processing period indicator is received.

If at act 904 the data processor determines that data is being sent to the serial device, the advance logic may check to determine whether the data processor is storing data in a predetermined position of a buffer memory space accessible to the data processor (act 912). If the data processor is storing data in the predetermined position of a buffer memory space accessible to the data processor, this same data is also stored in the advanced register that is associated with this buffer memory space (act 914). If the data processor is not storing data in the predetermined position of a buffer memory space accessible to the data processor, then the data is stored within a buffer memory space accessible to the data processor (act 916). At substantially the same time that data is stored in the data processor accessible buffer memory space and/or the advance logic, or after a delay, the data processor may determine if a new processing period indicator has been received (act 908) or whether additional transmission operations exist (act 910). In some implementations, the predetermined position may be the first memory position.

Figure 10:
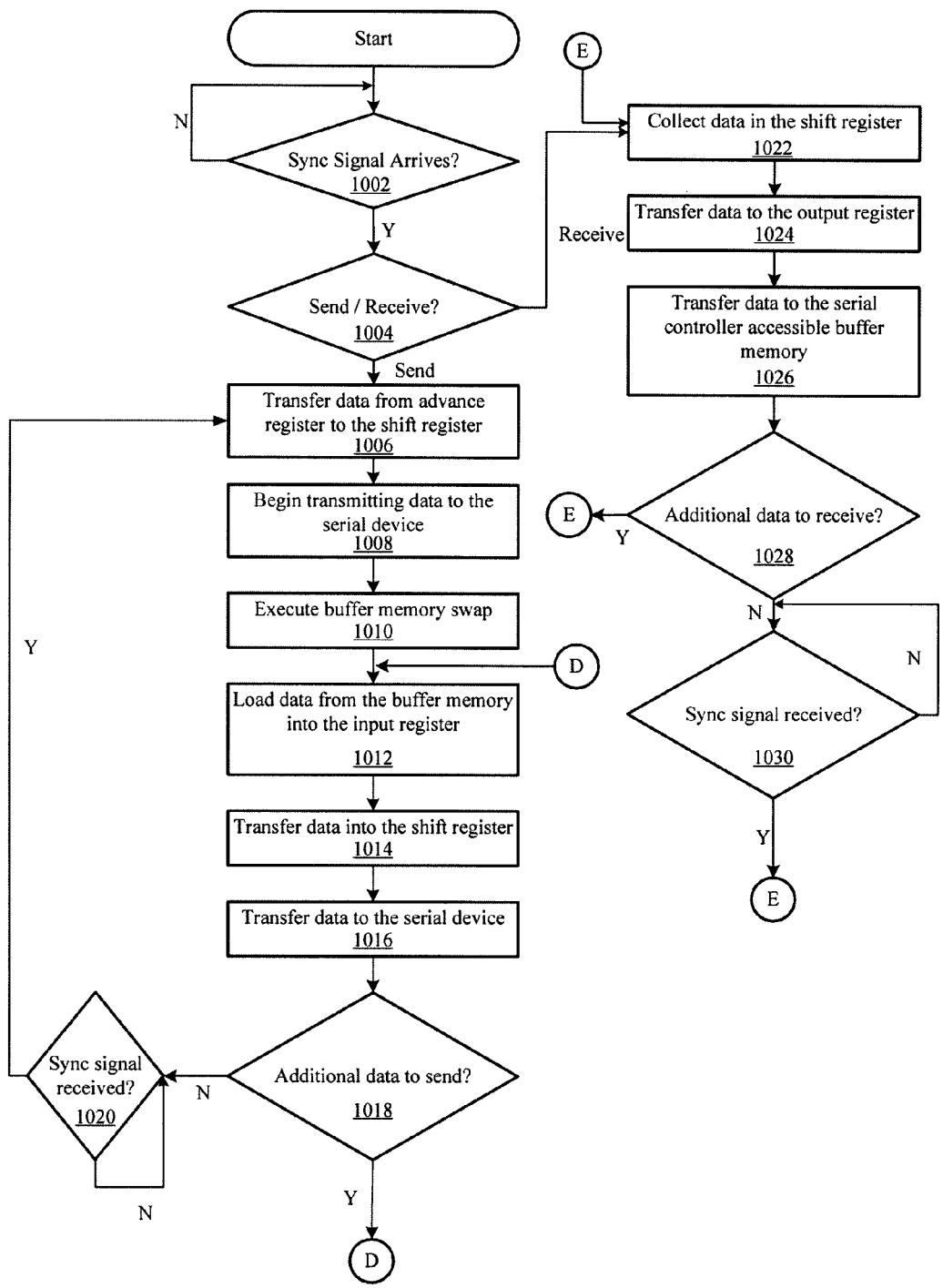
FIG. 10 shows the acts taken by a serial communication input output interface engine to communicate with a serial device.

FIG. 10 shows the acts taken by a serial communication I/O interface engine to communicate with a serial device. Upon power up or a reset/re-initialization command, the serial controller receives a synchronization signal (act 1002). A check is performed by the serial controller to determine whether data is being sent or received over a communication channel port (act 1004). The serial controller may determine whether data is being sent or received over a communication channel port by determining whether the communication channel port is configured as a transmitter or a receiver. If data is being sent over the communication channel port (e.g., the serial controller subsystem is configured to send data), data stored in the advance register, is transferred in parallel to the shift register (act 1006). After the full value of data is transferred to the shift register, the serial controller begins transmitting the contents of the shift register to a serial device on a bit-by-bit basis (act 1008). While this data is being sent to a serial device, a buffer memory swap occurs, coupling the serial controller subsystem to a buffer memory that was previously accessible by the data processor (act 1010).

At act 1012, data (e.g., the next word) is loaded from the buffer memory accessible to the serial controller subsystem into the input register. The data loaded into the input register is transferred in parallel to the shift register (act 1014). The serial controller transfers the data from the shift register to a serial device on a bit-by-bit basis (act 1016).

A check may be performed by the serial controller to determine if there is additional data to send to the data processor (act 1018). If there is additional data to send to the data processor, the process of FIG. 10 may restart at point "D." If there is no additional data to send to the data processor, the serial controller may check to determine if a new processing period is beginning (e.g., a synchronization signal has been received) (act 1020). If a new processing period or synchronization event is beginning, the current value stored in the advance register, which was stored in the predetermined location of the buffer memory accessible to the data processor during the last processing period, is transferred to the shift register (act 1006) and the transmission process of FIG. 10 continues. Otherwise, the serial controller may remain idle with respect to serial data transmissions and await a synchronization signal.

If at act 1004 the serial controller determines that data is to be received, the data may be collected in the shift register on a bit-by-bit basis (act 1022). Once a full value is received, the data may be transferred in parallel to the output register (act 1024). The serial controller may then transfer the data from the output register to its accessible buffer memory space (act 1026).

A check may be performed by the serial controller to determine if there is additional data to be received from the data processor (act 1028). If there is additional data to be received from the data processor, the process of FIG. 10 may restart at point "E." If there is no additional data to be received from the data processor, the serial controller may check to determine if a synchronization signal has been received (act 1030). If a synchronization signal has been received, the process of FIG. 10 may restart at point "E" with access to the buffer memory space that was previously accessible to the data processor. Otherwise, the serial controller may remain idle with respect to serial data transmissions and await a synchronization signal.

The serial interface engine permits a data processor to process data up to substantially the end of a processing period and still have the processed data accessible to a serial device during the next processing period without delays or temporal mismatches in the data samples. Additionally, the serial interface engine permits the data processor to operate free of potential time delays imposed by a serial device.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. An apparatus comprising:
   a processor;
   a communication subsystem comprising an advance register;
   a first buffer memory;
   a second buffer memory; and
   a serial controller operable to alternately swap access to the first buffer memory and the second buffer memory between the processor and the communication subsystem;
   where wherein the advance register is operable to duplicate data written to a predetermined location of the first buffer memory when the first buffer memory is accessible to the processor, and
   wherein the serial controller is further operable to:
      receive a first clock signal indicative of a first operating frequency for the processor;
      receive a second clock signal indicative of a second operating frequency for a serial device, the first operating frequency being different than the second operating frequency;
      receive a synchronization signal having a frequency, the synchronization signal to account for the first operating frequency and the second operating frequency, the synchronization signal to synchronize operation of a serial communication interface engine between the processor and the serial device and the synchronization signal being indicative of a new processing period;
      verify that no accesses to the first memory buffer and the second memory buffer are pending in response to the synchronization signal; and
      swap access to the first buffer memory and the second buffer memory between the processor and the communication subsystem in response to verifying that no accesses to the first memory buffer and the second memory buffer are pending.

2. The apparatus of claim 1, where the communication subsystem further comprises advance logic to monitor data written to the predetermined location of the first buffer memory.

3. The apparatus of claim 1, where the communication subsystem further comprises a shift register section that is selectively configurable between data transmission and data reception.

4. The apparatus of claim 3, where the shift register section further comprises an input register selectively coupled to the first buffer memory and the second buffer memory, the input register configured to receive data to be transmitted to the serial device.

5. The apparatus of claim 3, where the shift register section further comprises a shift register coupled to the serial device, the shift register configured to receive data from the serial device.

6. The apparatus of claim 3, where the shift register section further comprises an output register coupled to the shift register and to the controller, the output register configured to receive shift register data and to provide the shift register data to the controller.

7. A communication system comprising:
   a processor;
   a first buffer memory selectively coupled with the processor;
   a second buffer memory selectively coupled with the processor;
   serial controller coupled to a shift register section, the serial controller configured to perform an access swap of the first buffer memory and the second buffer memory between the processor and the serial controller;
   an advance register coupled to the shift register section; and
   address comparison logic operable to monitor when a data value is written into a predetermined location in the first buffer memory during a processing period and forward the data value to the advance register during the processing period that the data value is written into the predetermined location in the first buffer memory;
   where wherein the shift register section is operable to obtain the data value from the advance register instead of from the first buffer memory, and transmit the data value, and
   wherein the serial controller is further configured to:
      receive a first clock signal indicative of a first operating frequency for the processor;
      receive a second clock signal indicative of a second operating frequency for a serial device, the first operating frequency being different than the second operating frequency;
      receive a synchronization signal having a frequency, the synchronization signal to account for the first operating frequency and the second operating frequency, the synchronization signal to synchronize operation of a serial communication interface engine between the processor and the serial device and the synchronization signal being indicative of a new processing period;
      verify that no accesses to the first memory buffer and the second memory buffer are pending in response to the synchronization signal; and
      swap access of the first buffer memory and the second buffer memory between the processor and the serial controller in response to verifying that no accesses to the first memory buffer and the second memory buffer are pending.

8. The communication system of claim 7, where the advance register is one of multiple advance registers and the shift register section is one of multiple shift register sections.

9. The communication system of claim 7 where the shift register section comprises a multiplexer including a first input coupled to an input register and a second input coupled to the advance register.

10. The communication system of claim 9 where the multiplexer comprises an output coupled to a staging register, and where the shift register section is operable to transmit the data value from the staging register.

11. The communication system of claim 10 where the staging register comprises a shift register.

12. An apparatus comprising:
a data processor for providing data;
a serial subsystem including a serial controller that is configured to:
receive a first clock signal indicative of a first operating frequency for the data processor;
receive a second clock signal indicative of a second operating frequency for a serial device, the first operating frequency being different than the second operating frequency;
receive a synchronization signal having a frequency, the synchronization signal to account for the first operating frequency and the second operating frequency, the synchronization signal to synchronize operation of a serial communication interface engine between the processor and the serial device and the synchronization signal being indicative of a new processing period;
verify that no accesses to a first memory buffer and to a second memory buffer are pending; and
swap access to a first buffer memory and a second buffer memory between the data processor and the serial subsystem in response to verifying that no accesses to the first memory buffer and the second memory buffer are pending.

13. The apparatus of claim 12, wherein the serial subsystem further comprises advance logic to monitor data written to a predetermined location of the first buffer memory.

14. The apparatus of claim 13, wherein the serial subsystem further comprises a shift register section that is selectively configurable between data transmission and data reception.

15. The apparatus of claim 14, wherein the shift register section further comprises an input register selectively coupled to the first buffer memory and the second buffer memory, the input register configured to receive data to be transmitted to the serial device.

16. The apparatus of claim 14, where the shift register section further comprises a shift register coupled to the serial device, the shift register configured to receive data from the serial device.

17. The apparatus of claim 14, wherein the shift register section further comprises an output register coupled to the shift register and to the controller, the output register configured to receive shift register data and to provide the shift register data to the controller.

18. The apparatus of claim 12 wherein the first buffer memory and the second buffer memory are each arranged to store digital samples of an audio signal.

19. The apparatus of claim 1 wherein the first buffer memory and the second buffer memory are each arranged to store digital samples of an audio signal.

20. The communication system of claim 7 wherein the first buffer memory and the second buffer memory are each arranged to store digital samples of an audio signal.

* * * * *